US00RE42582E

(19) United States
(12) Reissued Patent
Fukuda et al.

(10) Patent Number: US RE42,582 E
(45) Date of Reissued Patent: Aug. 2, 2011

(54) METHOD FOR PRODUCING ALUMINUM TITANATE SINTERED OBJECT

(75) Inventors: Tsutomu Fukuda, Kakogawa (JP); Masahiro Fukuda, Uji (JP); Masaaki Fukuda, Kakogawa (JP)

(73) Assignee: Ohcera Co., Ltd., Osaka-shi (JP)

( * ) Notice: This patent is subject to a terminal disclaimer.

(21) Appl. No.: 12/073,710

(22) PCT Filed: Nov. 6, 2001

(86) PCT No.: PCT/JP01/09692

§ 371 (c)(1),
(2), (4) Date: Jul. 16, 2002

(87) PCT Pub. No.: WO02/38519

PCT Pub. Date: May 16, 2002

Related U.S. Patent Documents

Reissue of:
(64) Patent No.: 7,011,788
Issued: Mar. 14, 2006
Appl. No.: 10/169,728
Filed: Jul. 16, 2002

(30) Foreign Application Priority Data

Nov. 8, 2000 (JP) ..... 2000-340789

(51) Int. Cl.
*C04B 33/32* (2006.01)

(52) U.S. Cl. ..... 264/681

(58) Field of Classification Search ..... 264/474, 264/681, 658; 423/598; 501/127
See application file for complete search history.

(56) References Cited

U.S. PATENT DOCUMENTS

| | | | | |
|---|---|---|---|---|
| 2,287,538 | A * | 6/1942 | Schusterius | 501/142 |
| 3,825,653 | A | 7/1974 | Duerksen et al. | 423/598 |
| 4,098,725 | A | 7/1978 | Yamamoto et al. | 252/520.21 |
| 4,277,539 | A | 7/1981 | Keller et al. | 428/450 |
| 5,008,222 | A | 4/1991 | Kameda | 501/134 |
| 6,403,019 | B1 * | 6/2002 | Fukuda et al. | 264/658 |
| 7,011,788 | B2 * | 3/2006 | Fukuda et al. | 264/674 |
| 7,148,168 | B2 * | 12/2006 | Fukuda et al. | 501/134 |
| 7,166,552 | B2 * | 1/2007 | Fukuda et al. | 501/136 |

FOREIGN PATENT DOCUMENTS

| | | |
|---|---|---|
| JP | 1-183463 | 7/1989 |
| JP | 01-183463 | 7/1989 |
| JP | 7-17764 | 1/1995 |
| JP | 07-017764 | 1/1995 |
| JP | 9-10527 | 1/1997 |
| JP | 09010527 | 1/1997 |

OTHER PUBLICATIONS

Huang et al.; "Effect of Excess $S_iO_2$ on the Reaction Sintering of Aluminium Titanate—25 Vol% Mullite Composites"; Ceramics International 24 (1998) pp. 223-228.
Singer et al.; "Industrial Ceramics", Chapman and Hall; pp. 101-102, 1979.
European Search Report dated Dec. 15, 2008.
Yoshida; "Kouzan-Butsu No Chishiki to Torihihiki", Zaidan Hojin Tsusho Sangyo Chousa-kai; Mar. 7, 1992; pp. 392 and 429.

* cited by examiner

*Primary Examiner* — Matthew J Daniels
*Assistant Examiner* — Erin Snelting
(74) *Attorney, Agent, or Firm* — Kratz, Quintos & Hanson, LLP

(57) ABSTRACT

The present invention provides a process for preparing an aluminum-titanate-based sintered body comprising the step of firing, at 1250 to 1700° C., a formed product prepared from a raw material mixture containing 100 parts by weight of a mixture of $TiO_2$ and $Al_2O_3$ in a weight ratio of $TiO_2$:$Al_2O_3$=40:60 to 60:40, and 1 to 15 parts by weight of an alkali feldspar represented by the formula:$(Na_xK_{1-x})AlSi_3O_8$ wherein $0 \leqq x \leqq 1$.
According to the process of the present invention, it is possible to obtain an aluminum-titanate-based sintered body in which inherent properties of an aluminum titanate, i.e., a low coefficient of thermal expansion and high corrosion resistance are maintained, the mechanical strength thereof is improved, and which can be stably used even under high temperature conditions.

2 Claims, No Drawings

METHOD FOR PRODUCING ALUMINUM TITANATE SINTERED OBJECT

Matter enclosed in heavy brackets [ ] appears in the original patent but forms no part of this reissue specification; matter printed in italics indicates the additions made by reissue.

TECHNICAL FIELD

The present invention relates to a process for preparing an aluminum-titanate-based sintered body.

BACKGROUND ART

A sintered body of aluminum titanate has a low thermal expansion coefficient and high corrosion resistance, and is known as a heat-resistant material which exhibits low wettability with molten metal, corrosion resistance, spalling resistance and other excellent properties when used as a material for container, ladle, gutter, etc., for molten metal of aluminum, aluminum alloys, pig iron or the like. However, since the crystal grains constituting a sintered body of aluminum titanate are anisotropic, the sintered body has drawbacks that the micro crack formation at the crystal grain boundary often occurs due to the stress caused by thermal expansion, and that the mechanical strength is easily weakened pursuant to the progress of micro cracks and gaps.

Thus, a conventional sintered body of aluminum titanate is insufficient in strength, and, particularly, can not exhibit sufficient durability when used under high temperature and loaded conditions.

Further, since aluminum titanate is unstable at temperatures of 1280° C. or below and easily decomposed into $TiO_2$ and $Al_2O_3$ when used under high temperature conditions of approximately 800 to 1280° C., it is difficult to continuously use the sintered body of aluminum titanate within such temperature range.

In order to improve sinterability of aluminum titanate and restrain the thermal decomposition thereof, additives such as silicon dioxide are mixed with the raw material for sintering. In this case, however, the refractoriness of the obtained sintered body is easily diminished, and it is not possible to obtain a sintered body of aluminum titanate having refractoriness so as to be usable in high temperatures over about 1400° C. and also possessing high mechanical strength.

DISCLOSURE OF INVENTION

A primary object of the present invention is to provide an aluminum-titanate-based sintered body in which inherent properties of a sintered body of aluminum titanate, i.e., low thermal expansion coefficient and superior corrosion resistance are maintained, the mechanical strength thereof is improved, and which can be stably used even under high temperature conditions.

In view of the foregoing problems of the prior art, the present inventors carried out extensive research. Consequently, the inventors found that when producing a sintered body of aluminum titanate by sintering a raw material powder containing titanium dioxide and alumina, Si atoms dissolve in the aluminum titanate crystals by adding a specific alkali feldspar to the raw material powder and the growth of the crystal grain is restrained to give a dense sintered body. Furthermore, the inventors found that the obtained sintered body possesses both high mechanical strength and low thermal expansion coefficient and, in addition, is superior in decomposition resistance, refractoriness, and so on. The present invention has been accomplished based on these findings.

The present invention provides a process for preparing an aluminum-titanate-based sintered body as described below.

1. A process for preparing an aluminum-titanate-based sintered body comprising the step of firing a formed product at 1250 to 1700° C.,
   the formed product being prepared from a raw material mixture containing:
   100 parts by weight of a mixture containing $TiO_2$ and $Al_2O_3$ in a weight ratio of $TiO_2$:$Al_2O_3$=40:60 to 60:40, and
   1 to 15 parts by weight of an alkali feldspar represented by the formula: $(Na_xK_{1-x})AlSi_3O_8$ wherein $0 \leqq x \leqq 1$.
2. The process for preparing an aluminum-titanate-based sintered body according to item 1, wherein the formed product is fired under a reducing atmosphere.
3. The process for preparing an aluminum-titanate-based sintered body according to item 1 or 2, wherein x in the formula: $(Na_xK_{1-x})AlSi_3O_8$ is $0.1 \leqq x \leqq 1$.
4. An aluminum-titanate-based sintered body obtainable by the process according to any one of items 1 to 3 above.

The process for preparing an aluminum-titanate-based sintered body according to the present invention is a method wherein a formed product is prepared from a raw material obtained by adding an alkali feldspar represented by the formula: $(Na_xK_{1-x})\ AlSi_3O_8$ $(0 \leqq x \leqq 1)$ to a mixture containing $TiO_2$ and $Al_2O_3$, and fired at a temperature ranging from 1250 to 1700° C.

Usable $TiO_2$ and $Al_2O_3$ as the raw material are not limited insofar as they are capable of forming aluminum titanate when fired. Normally, they are suitably selected from the raw materials for producing various ceramics such as alumina ceramics, titania ceramics, aluminum titanate ceramics, and so on. Particularly, when using anatase $TiO_2$ as $TiO_2$, and sinterable alpha-alumina as $Al_2O_3$, the reactivity of both constituents is high, and it is possible to form aluminum titanate in a short period of time and in high yield.

The mixing ratio of $TiO_2$ and $Al_2O_3$ may be in a range wherein $TiO_2$:$Al_2O_3$ (weight ratio)=about 40:60 to about 60:40, and preferably in a range wherein $TiO_2$:$Al_2O_3$ (weight ratio)=about 40:60 to about 45:55.

The alkali feldspar used as the additive is represented by the formula: $(Na_xK_{1-x})\ AlSi_3O_8$, wherein x in the formula is $0 \leqq x \leqq 1$. Particularly, in the aforementioned formula, the range of $0.1 \leqq x \leqq 1$ is preferable, and the range of $0.15 \leqq x \leqq 0.85$ is more preferable. The alkali feldspar having an x value in the range as described above has a melting point lower than the formation temperature of aluminum titanate, and is especially effective in promoting the sintering of aluminum titanate.

The amount of alkali feldspar to be used may be about 1 to about 15 parts by weight, preferably about 4 to about 10 parts by weight based on 100 parts by weight of the total weight of $TiO_2$ and $Al_2O_3$.

According to the process of the present invention, by mixing the aforementioned specific alkali feldspar as an additive with the mixture containing $TiO_2$ and $Al_2O_3$, forming the mixture into a desired shape and then firing the formed product, the grain growth of aluminum titanate is restrained and a dense sintered body can be obtained. The reason for this is believed to be that when synthesizing aluminum titanate by firing, Si within the alkali feldspar dissolves in the crystal lattice and is substituted for Al, and, as Si has a smaller ion radius than Al, the bond length with the surrounding oxygen atoms is shortened, and the crystal is densified as a result thereof.

The raw material mixture comprising $TiO_2$, $Al_2O_3$ and alkali feldspar may be sufficiently mixed, pulverized to a suitable particle size, and formed into a desired shape.

There is no particular limitation on the method of mixing and pulverizing the raw material mixture, and an ordinary method may be employed; for example, mixing and pulverization may be conducted with the use of a ball mill, media agitating mill, or the like.

There is no particular limitation on the degree of pulverizing the raw material mixture, but the raw material mixture is preferably pulverized until a grain size of approximately 1 μm or less is attained.

When necessary, it is also possible to mix a forming aid with the raw material mixture. The forming aid for use herein may be selected from those which have been conventionally used depending on the forming method.

Such useful forming aids include binders such as polyvinyl alcohol, microwax emulsion and carboxymethyl cellulose; mold releasing agents such as stearic acid emulsion; antifoaming agents such as n-octyl alcohol and octylphenoxy ethanol; and deflocculating agents such as diethylamine, triethylamine, etc.

There is also no particular limitation on the amount of such forming aids to be used, and the amount may be suitably selected within the range of the amount of conventional forming aids depending on the forming method. For example, in slip casting, the binder may be used in an amount of about 0.4 to about 0.6 parts by weight; the deflocculating agent may be used in an amount of about 0.5 to about 1.5 parts by weight; the mold releasing agent may be used in an amount of about 0.2 to about 0.7 parts by weight (solid weight); and the antifoaming agent may be used in an amount of about 0.03 to about 0.1 parts by weight, all based on 100 parts by weight of the total weight of $TiO_2$ and $Al_2O_3$.

There is also no particular limitation on the method of forming the raw material mixture and conventional forming methods such as press molding, sheet casting, slip casting, extrusion molding, injection molding, CIP molding, etc. may be suitably employed.

The firing temperature may be about 1250 to about 1700° C., preferably about 1400 to about 1700° C. There is no particular limitation on the atmosphere for firing, and any one among oxygen-containing atmosphere such as air, reducing atmosphere, inactive atmosphere, etc. conventionally employed maybe used. Particularly, firing under reducing atmospheres such as hydrogen atmosphere, carbon monoxide atmosphere, natural gas atmosphere and LPG atmosphere is effective, as a dense sintered body with superior strength can be formed easily.

There is no particular limitation on the firing time, and firing may be continued until the sintering reaction sufficiently progresses in accordance with the shape of the formed product, etc., and, normally, firing is conducted for about 1 to about 10 hours while maintaining the aforementioned temperature range. There is also no particular limitation on the heating rate and cooling rate upon firing insofar as such rates are set to conditions where cracks will not be generated in the sintered body.

The sintered body obtained by the process of the present invention is an aluminum-titanate-based sintered body wherein Si dissolves in the crystal lattice of aluminum titanate and is substituted for Al, and the lattice constant has a smaller value in comparison with pure aluminum titanate. As a result, the obtained sintered body has a stable crystal structure and becomes a sintered body with fine crystal grains because the crystal grain growth is restrained. The sintered body as described above in which the crystal grain growth is restrained does not need to generate cracks aiming at relaxing the distortion caused by thermal expansion, and becomes a dense product with high mechanical strength.

The sintered body obtained by the process of the present invention possesses superior characteristics as described above; for example, high mechanical strength and low thermal expansion coefficient. In addition, as the crystal structure is stabilized, this sintered body is also superior in decomposition resistance and refractoriness. As a result, this sintered body can be stably used under temperatures from several hundred degrees Celsius to about 1600° C. as the decomposition reaction of aluminum titanate is restrained. Moreover, the sintered body possesses refractoriness of SK 40 (1920° C.) or more which far exceeds the melting point of aluminum titanate, which is 1860° C. Further, the sintered body obtained by the process of the present invention has extremely superior non-wetting property and corrosion resistance against molten metal, and, as a result, exhibits superior erosion resistance inconceivable with conventional material against flowing molten metal.

By utilizing the superior characteristics described above, the aluminum-titanate-based sintered body of the present invention may be used for various purposes; for example, containers for high melting point metals such as crucibles, ladles, and gutters; high temperature components of aircraft jet engines; jet nozzles; high temperature components of various internal combustion engines such as glow plugs, cylinders and piston heads; outer wall thermal insulation and shields of space crafts; and so on. Moreover, by utilizing its low expansion characteristics, this aluminum-titanate-based sintered body may also be effectively used as a surface plate for printing processing in an LSI manufacturing process.

As described above, the aluminum-titanate-based sintered body obtained by the process according to the present invention maintains a low coefficient of thermal expansion which is an inherent property of aluminum titanate, possesses high mechanical strength, and has high thermal shock resistance. Moreover, this aluminum-titanate-based sintered body has extremely high refractoriness of SK 40 (1920° C.) or more which is prescribed in JIS R 2204, exhibits superior decomposition resistance, and can be stably used under high temperature conditions.

EXAMPLES

The present invention is now explained in detail with reference to the following examples.

Example 1

To a mixture (100 parts by weight) consisting of 43.9% by weight of titanium oxide in anatase form and 56.1% by weight of sinterable alpha-alumina, 4 parts by weight of Fukushima-grown alkali feldspar ($(Na_{0.39}K_{0.61})AlSi_3O_8$) as the additive, 1.5 parts by weight of diethanolamine as the deflocculating agent, 0.4 parts by weight of polyvinyl alcohol as the binder, and 30 parts by weight of water were added to obtain the raw material mixture. This raw material mixture was placed in a ball mill and mixed for 3 hours. The obtained slurry was then left to stand for 50 hours, thereafter cast in a crucible mold, and removed after 2 hours to obtain a cylindrical compact with a 6 cm diameter and 8 cm height.

After air-drying this compact for 24 hours, the compact was further dried in a drier at a temperature of 60° C. or below until the water content became 1% or less.

After removing the compact from the drier, the compact was heated to 1600° C. in 13 hours, fired at 1600° C. for 2 hours, and thereafter left to cool. Firing was conducted under atmospheric atmosphere.

The lattice constant calculated from the X-ray diffraction pattern regarding the obtained sintered body is shown below in Table 1. The lattice constant of a pure aluminum titanate is also shown for comparison.

TABLE 1

| | Lattice Constant (Å) | | | |
|---|---|---|---|---|
| | a | b | C | True Density |
| Sintered Body of Example 1 | 9.423 | 9.626 | 3.586 | 3.713 |
| Aluminum Titanate | 9.429 | 9.636 | 3.590 | 3.704 |

As is clear from the above results, with the sintered body obtained by the process of the present invention, it has been confirmed that the lattice constant is smaller than aluminum titanate in all crystal axes, and that Si was dissolved in aluminum titanate crystal by substitution.

Further, Table 2 shows the results upon measuring the thermal expansion coefficient of this sintered body and pure aluminum titanate at a heating rate of 20° C./minute, and Table 3 shows the results upon measuring the thermal expansion coefficient of this sintered body and pure aluminum titanate at a cooling rate of 20° C./minute.

TABLE 2

| | Thermal Expansion Coefficient (%) (Heating) | |
|---|---|---|
| Temperature ° C. | Sintered Body of Example 1 | Aluminum Titanate |
| 30 | 0 | 0 |
| 80 | −0.007 | −0.005 |
| 130 | −0.016 | −0.011 |
| 180 | −0.023 | −0.019 |
| 230 | −0.03 | −0.027 |
| 280 | −0.036 | −0.034 |
| 330 | −0.04 | −0.04 |
| 380 | −0.043 | −0.044 |
| 430 | −0.045 | −0.048 |
| 480 | −0.045 | −0.049 |
| 530 | −0.044 | −0.048 |
| 580 | −0.041 | −0.046 |
| 630 | −0.037 | −0.042 |
| 680 | −0.03 | −0.037 |
| 730 | −0.02 | −0.032 |
| 780 | −0.006 | −0.028 |
| 830 | 0.008 | −0.026 |
| 880 | 0.022 | −0.023 |
| 930 | 0.039 | −0.017 |
| 980 | 0.056 | −0.012 |
| 1000 | 0.063 | −0.011 |

TABLE 3

| | Thermal Expansion Coefficient (%) (Cooling) | |
|---|---|---|
| Temperature ° C. | Sintered Body of Example 1 | Aluminum Titanate |
| 1000 | 0.019 | −0.072 |
| 980 | 0.004 | −0.085 |

TABLE 3-continued

| | Thermal Expansion Coefficient (%) (Cooling) | |
|---|---|---|
| Temperature ° C. | Sintered Body of Example 1 | Aluminum Titanate |
| 930 | −0.029 | −0.112 |
| 880 | −0.063 | −0.131 |
| 830 | −0.099 | −0.146 |
| 780 | −0.137 | −0.159 |
| 730 | −0.174 | −0.173 |
| 680 | −0.21 | −0.187 |
| 630 | −0.241 | −0.192 |
| 580 | −0.246 | −0.184 |
| 530 | −0.233 | −0.17 |
| 480 | −0.216 | −0.155 |
| 430 | −0.196 | −0.138 |
| 380 | −0.177 | −0.121 |
| 330 | −0.155 | −0.101 |
| 280 | −0.132 | −0.081 |
| 230 | −0.108 | −0.06 |
| 180 | −0.032 | −0.037 |
| 130 | −0.056 | −0.011 |
| 80 | −0.027 | 0.018 |
| 50 | −0.003 | 0.038 |

As is clear from the results indicated above, the sintered body obtained by the aforementioned method has a small thermal expansion coefficient, and maintains the low expansion characteristics inherent in aluminum titanate.

Further, as a thermal shock resistance test on the sintered body obtained in Example 1, a rapid cooling test by placing the sintered body heated to 1250° C. into ice water of 0° C. as well as a rapid heating test by rapidly heating a sintered body of −25° C. to 1500° C. with a gas burner were conducted. The result was that no cracks were generated, and the sintered body showed superior thermal shock resistance.

Example 2

The same raw material mixture used in Example 1 was mixed in a ball mill for 3 hours, and the obtained slurry was dried at 120° C. for 4 hours, and thereafter molded into a shape of 120 mm×35 mm×25 mm (thickness) or 120 mm×35 mm×20 mm (thickness) (specimen for measuring a coefficient of liner expansion on heating) at a molding pressure of 60 MPa.

The obtained compact was fired with the following firing pattern 1 or firing pattern 2 and left to cool to obtain an aluminum-titanate-based sintered body.

1. Firing Pattern 1 (Firing at 1540° C.)
   from 0 to 180° C. in 4 hours
   from 180 to 250° C. in 3 hours
   from 250 to 450° C. in 3 hours
   at 450° C. for 3 hours
   from 450 to 1540° C. in 6 hours
   at 1540 ° C. for 2 hours
2. Firing Pattern 2 (Firing at 1600° C.)
   from 0 to 180° C. in 4 hours
   from 180 to 250 ° C. in 3 hours
   from 250 to 450° C. in 3 hours
   at 450° C. for 3 hours
   from 450 to 1600° C. in 6 hours
   at 1600° C. for 2 hours Measurement results of the physical properties of the respective sintered bodies obtained above are shown below in Table 4.

TABLE 4

| Firing Temperature (° C.) | 1540 | 1600 |
|---|---|---|
| Contraction Rate by Firing (%) | −9.63 | −9.55 |
| Apparent Porosity (%) | 7.3 | 5.5 |
| Water Absorption (%) | 2.2 | 1.7 |
| Apparent Specific Gravity | 3.56 | 3.49 |
| Bulk Specific Gravity | 3.30 | 3.30 |
| Refractoriness (SK) | 40 or more | 40 or more |
| Bending Strength (MPa) | 50 | 40 |
| Room Temperature | | |
| Liner Expansion Rate on Heating (%) | | |
| 500° C. | −0.09 | ±0 |
| 750° C. | −0.08 | −0.02 |
| 100° C. | +0.04 | +0.10 |

As is clear from the results indicated above, the sintered bodies obtained by the aforementioned method have a low thermal expansion coefficient, and possess high refractoriness and high mechanical strength.

The thermal shock resistance test was conducted on the sintered bodies obtained in Example 2 by the same manner as in Example 1. The result was that no cracks were generated, and the sintered bodies showed superior thermal shock resistance.

The invention claimed is:

1. A process for preparing an aluminum-titanate-based sintered body comprising the step of firing a formed product at 1250 to 1700° C., the formed product being prepared from a raw material mixture containing:

100 parts by weight of a mixture containing $TiO_2$ and $Al_2O_3$ in a weight ratio of $TiO_2$: $Al_2O_3$=40:60 to 60:40, and 1 to 15 parts by weight of an alkali feldspar represented by the formula: $(Na_xK_{1-x})AlSi_3O_8$ wherein [$0 \leqq x \leqq 1$] *$0.15 \leqq x \leqq 0.85$*.

2. The process for preparing an aluminum-titanate-based sintered body according to claim 1, wherein the formed product is fired under a reducing atmosphere.

[3. The process for preparing an aluminum-titanate-based sintered body according to claim 1 or 2, wherein x in the formula: $(Na_xK_{1-x})AlSi_3O_8$ is $0.1 \leqq x \leqq 1$.]

* * * * *